US009534915B2

United States Patent
Chang et al.

(10) Patent No.: US 9,534,915 B2
(45) Date of Patent: Jan. 3, 2017

(54) DYNAMIC ATTRACTION INFERENCE IN ROUTE RECOMMENDATIONS

(71) Applicant: International Business Machines Corporation, Armonk, NY (US)

(72) Inventors: Billy W. Chang, Rockville, MD (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 123 days.

(21) Appl. No.: 14/500,420

(22) Filed: Sep. 29, 2014

(65) Prior Publication Data
US 2016/0091332 A1    Mar. 31, 2016

(51) Int. Cl.
G01C 21/36 (2006.01)
G06K 9/62 (2006.01)
G06K 9/00 (2006.01)
G06K 9/78 (2006.01)

(52) U.S. Cl.
CPC ....... G01C 21/3623 (2013.01); *G06K 9/00684* (2013.01); *G06K 9/00697* (2013.01); *G06K 9/00704* (2013.01); *G06K 9/00778* (2013.01)

(58) Field of Classification Search
CPC ................................................. G01C 21/3647
See application file for complete search history.

(56) References Cited

U.S. PATENT DOCUMENTS

| 8,204,684 B2 * | 6/2012 | Forstall ................. G01C 21/20 455/456.1 |
| 8,260,036 B2 * | 9/2012 | Hamza .................. B64G 1/646 382/154 |
| 8,401,785 B2 | 3/2013 | Cho et al. |
| 8,463,537 B2 * | 6/2013 | Mueller ............... G01C 21/362 701/302 |
| 9,074,892 B2 * | 7/2015 | Fink ....................... G01C 21/00 |
| 2010/0130226 A1 | 5/2010 | Arrasvuori et al. |

(Continued)

OTHER PUBLICATIONS

Corke et al., "Networked robots: Flying robot navigation using a sensor net", Robotics Research, The Eleventh International Symposium, Apr. 2005, pp. 234-243.*

(Continued)

*Primary Examiner* — Todd Melton
(74) *Attorney, Agent, or Firm* — Lee Law, PLLC; Christopher B. Lee (57) ABSTRACT

A set of images that each include a time and a date of image capture, a location of image capture, and a directional bearing of image capture are evaluated. The direction bearing of image capture specifies a direction of image capture relative to the respective location of image capture of each image. Images are correlated among the set of images that include a comparable date, time, and location of image capture. By analysis of image content within the correlated images, a determination is made that the correlated images include different directional representations of a single event, and that the single event is distinct from static fixed-location points of interest. Using the directional bearing of image capture of each correlated image, a location of an intersection region that results from intersecting directional bearings of image capture of the correlated images is identified as a dynamic attraction.

20 Claims, 6 Drawing Sheets

(56) References Cited

U.S. PATENT DOCUMENTS

2013/0090133 A1  4/2013  D' Jesus Bencci et al.
2015/0296186 A1* 10/2015  Renkis .................... H04L 67/10
                                                                  348/159

OTHER PUBLICATIONS

Hsieh et al., "Adaptive teams of autonomous aerial and ground robots for situational awareness", Journal of Field Robotics, vol. 24 No. 11-12, Nov.-Dec. 2007, pp. 991-1014.*

Author Unknown, Android Applications on Google Play: Compass, Webpage/site, Printed from website on May 27, 2014, p. 1, Google, Inc., Published at: https://market.android.com/details?id=com.apksoftware.compass&hl=en (and published alternatively at: https://play.google.com/store/apps/details?id=com.apksoftware.compass&hl=en).

Author Unknown, New system estimates geographic location of photos, Article, Phys.org, Jun. 18, 2008, pp. 1-11, Science X Network, Published online at: http://phys.org/news133004080.html.

Asim Toktosunov, Roadtrippers: Plan Your Trip & find Attraction Along the Route, Webpage/site, Jun. 23, 2012, pp. 1-3 (plus one citation page added), MakeUseOf, Published online at: http://www.makeuseof.com/dir/roadtrippers-plan-your-trip-find-attractions-along-the-route/.

* cited by examiner

DYNAMIC ATTRACTION INFERENCE IN ROUTE RECOMMENDATIONS

BACKGROUND

The present invention relates to travel route recommendations. More particularly, the present invention relates to dynamic attraction inference in route recommendations.

Users that travel may utilize large regional maps that include roadways to determine their own navigational requirements by which to reach their respective destinations. Alternatively, travel agencies or automobile clubs may also offer a route planning service, with routes drawn on maps for the traveler. As an additional option, travelers may utilize map providing websites that provide graphical maps with highlighted travel routes and directions.

BRIEF SUMMARY

A method includes evaluating a plurality of images that each comprise a time and a date of image capture, a location of image capture, and a directional bearing of image capture that specifies a direction of image capture relative to the respective location of image capture of each image; correlating images from the plurality of images that comprise a comparable date, time, and location of image capture; determining, by analysis of image content within the correlated images, that the correlated images comprise different directional representations of a single event that is distinct from static fixed-location points of interest; and identifying as a dynamic attraction, using the directional bearing of image capture of each correlated image, a location of an intersection region that results from intersecting directional bearings of image capture of the correlated images.

A system includes a memory; and a processor programmed to: evaluate a plurality of images within a memory that each comprise a time and a date of image capture, a location of image capture, and a directional bearing of image capture that specifies a direction of image capture relative to the respective location of image capture of each image; correlate images from the plurality of images that comprise a comparable date, time, and location of image capture; determine, by analysis of image content within the correlated images, that the correlated images comprise different directional representations of a single event that is distinct from static fixed-location points of interest; and identify as a dynamic attraction, using the directional bearing of image capture of each correlated image, a location of an intersection region that results from intersecting directional bearings of image capture of the correlated images.

A computer program product includes a computer readable storage medium having computer readable program code embodied therewith, where the computer readable program code when executed on a computer causes the computer to: evaluate a plurality of images that each comprise a time and a date of image capture, a location of image capture, and a directional bearing of image capture that specifies a direction of image capture relative to the respective location of image capture of each image; correlate images from the plurality of images that comprise a comparable date, time, and location of image capture; determine, by analysis of image content within the correlated images, that the correlated images comprise different directional representations of a single event that is distinct from static fixed-location points of interest; and identify as a dynamic attraction, using the directional bearing of image capture of each correlated image, a location of an intersection region that results from intersecting directional bearings of image capture of the correlated images.

DETAILED DESCRIPTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides dynamic attraction inference in route recommendations. The present technology evaluates a set of images that each includes a time and a date of image capture, a location of image capture, and a directional bearing of image capture that specifies a direction of image capture relative to the respective location of image capture of each. Images from the set of images that include a comparable date, time, and location of image capture are correlated. A determination is made, by analysis of image content within the correlated images, that the correlated images include different directional representations of a single (e.g., the same, a common) event that is distinct from static fixed-location points of interest. Using the directional bearing of image capture of each correlated image, a location of an intersection region that results from intersecting directional bearings of image capture of the correlated images is identified as a dynamic attraction. The dynamic attraction identified by the location of the intersection region may be provided as a dynamic event recommendation in association with a recommended travel route near the intersection region.

The terms "dynamic attraction" and "dynamic point of attraction" are utilized interchangeably herein, and are defined as events that are transient in at least one of time and location, such as a parade, a street show that displays local arts/crafts or where music is performed, a sporting competition/game, a flower exhibit, a rally, a public gathering, and other transient events that may be of interest to travelers. As such, the terms dynamic attraction and dynamic point of attraction are understood to be transient events that are not static points of interest (e.g., monuments, scenic overlooks, stationary sculptures, or other locations) for which global positioning system (GPS) coordinates may be statically presented in association with mapping technologies.

The terms "scene" and "event" are also utilized interchangeably herein and are defined as the image content of a single/common dynamic attraction. As such, a scene may be an object, setting, gathering of person(s), event, or other form of image content within a group of images that is represented from different angles (directional bearings) within different images.

The terms "direction of capture" or "directional bearing" are also utilized interchangeably herein and are defined as a compass bearing, such as a bearing used in the surveying profession to identify directions of lines on a survey map.

The term "intersecting region" is defined as an area of intersection of a set of directional bearings that represent directions of capture of multiple different images of a same scene from different positions/locations. An intersecting region may be a single horizontal location, or may be an aggregated region of different intersections of different bearings/directions of capture of different images.

Additionally, the term "comparable" as it relates to date, time, and location of image capture as utilized herein refers to contemporaneous dates, times, and locations that may be associated with the same dynamic attraction. For example, a comparable date and time may include times that are associated with the same calendar date, times that span a small number of calendar days (e.g., a duration of a festival or carnival), or other comparable dates/times that may be associated with a dynamic attraction as described herein. Additionally, comparable locations that may be associated with the same dynamic attraction may include locations that differ by as little as a few feet to locations that differ by several hundred feet. As such, these terms may reference contemporaneous times, dates, and locations that may surround a dynamic attraction or may be located along a corridor associated with a moving dynamic attraction.

The present technology identifies a direction of different photographs taken by different users that are present at the site of a dynamic attraction. Popularity of the dynamic attraction may be calculated based upon a number of users that contemporaneously capture images of the event and based upon how long the dynamic attraction exists. Because different users in a crowd at an event will be physically located at different positions relative to the event so that they all can see the event, photographs of the event captured from the different locations will each have different directional bearings. A compass-enabled mobile device may determine/calculate the direction of capture (directional bearing) of photographs taken with the respective device. Each image captured with such a device may be correlated in time and general location, and a converged point, referred to herein as the intersection region of the different directional bearings, may be designated as a dynamic attraction.

As different users capture photographs with different compass-enabled mobile devices, each device may tag the respective photographs with information that identifies a time and a date of image capture, a location of image capture, and a directional bearing that specifies a direction of capture relative to the respective location of image capture of the photograph. These photographs/images with the tagged information may be sent to a remote server, termed herein a dynamic attraction inference and route planning server.

The remote server may extrapolate the direction of capture of the respective photographs, and calculate possible meeting points/intersections of the different directions of capture. Using the captured time of different photographs over time, a duration the dynamic attraction may be determined (e.g., when the dynamic attraction is formed and how long the dynamic attraction exists). Again, a determination of popularity of a dynamic attraction may be determined based upon how many users have captured images of the respective event.

A location search may be performed relative to identified intersection regions to determine if the subject matter of the different images represents a static point of interest (POI), such as a monument, museum, etc. As such, the present technology may differentiate static points of interest from dynamic attractions.

A determination may also be performed over time using analysis of subsequent additional images to determine whether a previously-identified dynamic attraction has ended. If it is determined that the identified dynamic attraction was formed recently, and is not part of any static POI, the dynamic attraction may be designated a dynamic attraction to be provided as a dynamic event recommendation in association with a recommended travel route.

The dynamic attraction inference and route planning server may maintain a list of current dynamic points of attraction, and may routinely update the dynamic attraction list. With respect to route recommendations, when a user provides an origin and a destination location, a list of possible routes may be determined and provided to the user, such as via a graphical map interface, with identified contemporaneous dynamic attractions designated. The identified contemporaneous dynamic attractions designated on the map may be configured as links (e.g., hypertext links). If the user selects a dynamic attraction on the map, the link may be activated to retrieve image or video content posted in any social networking site or in any public domain. The user may view the image/video content in the map interface to determine if the user is interested in stopping at the dynamic attraction along the travel route. The user may select one or more dynamic attractions and an appropriate route may be selected that navigates the user to the different dynamic attractions.

It should be noted that conception of the present subject matter resulted from recognition of certain limitations associated with previous route recommendation technologies. For example, it was observed that static points of interest (POIs or SPOIs), such as monuments, museums, and other fixed venues are documented by map providers. It was further observed that by use of global positioning system (GPS) coordinates of the static POIs provided by the map providers, the static POIs may be provided to users of previous route recommendation technologies as suggestions for places to stop along a travel route. However, it was observed that other types of dynamic events or "dynamic attractions" may not be fixed in location or may exist for a relatively short period of time, and that these dynamic events/attractions may also be of interest to travelers, but that use of GPS coordinates would not provide a usable solution for identification of routing recommendations because the dynamic attraction may be finished or may have moved by the time a user arrives at a previous location of a dynamic attraction. Examples of recognized forms of "dynamic attractions" include events such as a parade, a street show that displays local arts/crafts or where music is performed, a sporting competition/game, a flower exhibit, and other transient events that may be of interest to travelers. It was further determined that previous route recommendation technologies did not recognize and were incapable of identifying these types of dynamic attractions, and as such, the previous technologies were also incapable of suggesting dynamic attractions to travelers. The present subject matter improves route recommendations by providing for detection and inference of such dynamic attractions, as described above and in more detail below. As such, improved route recommendations may be obtained through use of the present technology.

The dynamic attraction inference in route recommendations described herein may be performed in real time to allow prompt inferential detection of dynamic points of attraction. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Figure 1:
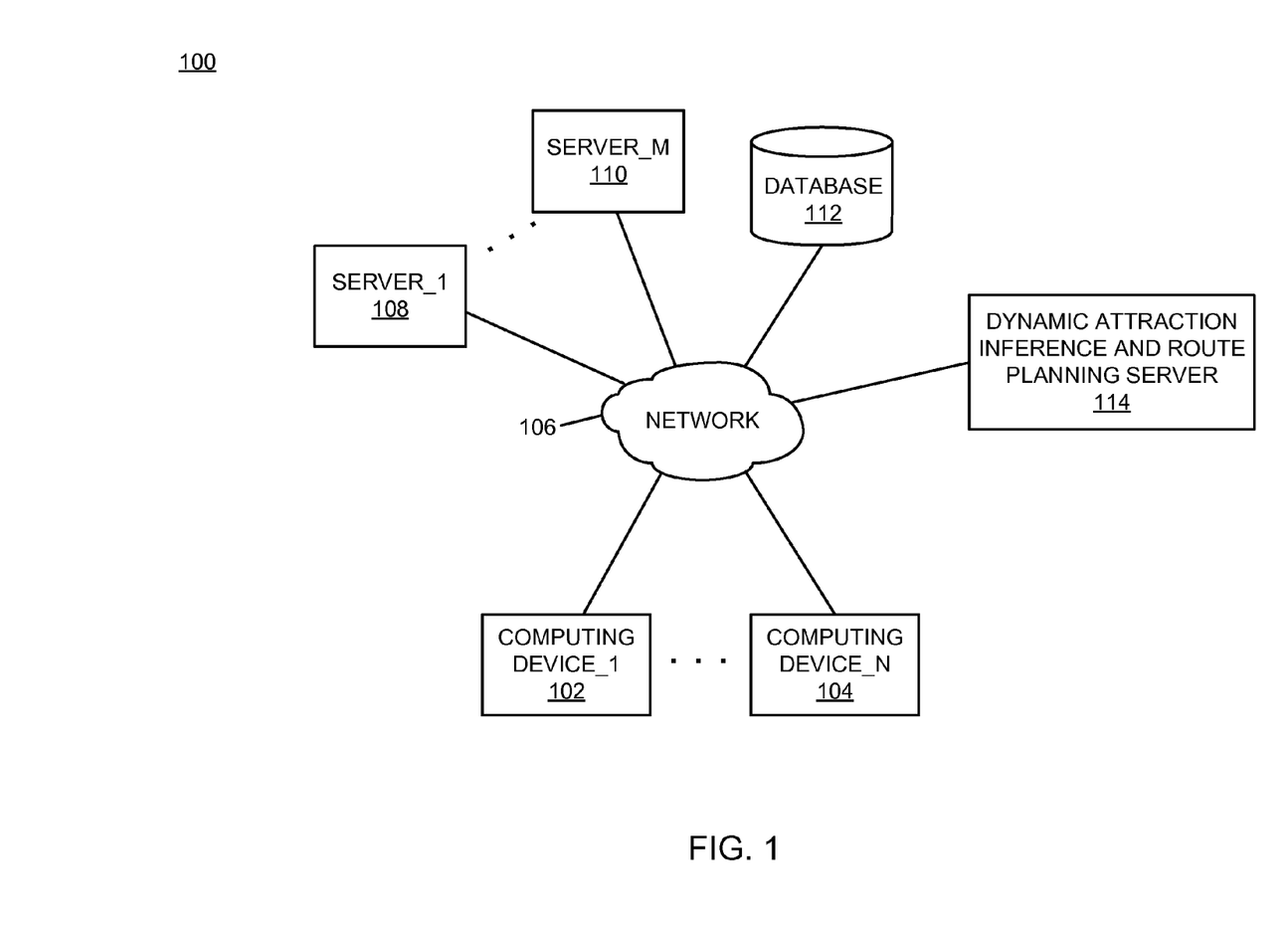
FIG. 1 is a block diagram of an example of an implementation of a system for dynamic attraction inference in route recommendations according to an embodiment of the present subject matter.

FIG. 1 is a block diagram of an example of an implementation of a system 100 for dynamic attraction inference in route recommendations. A computing device_1 102 through a computing device_N 104 communicate via a network 106 with several other devices. The other devices include a server_1 108 through a server_M 110. The server_1 108 through the server_M 110 may include social media servers or other servers as described in more detail below. Certain of the computing device_1 102 through the computing device_N 104 may include a camera, and users of these devices may take photographs of dynamic events as described herein and may upload the photographs to one or more of the server_1 108 through the server_M 110 to be shared with friends/contacts within the respective social networks. The server_1 108 through the server_M 110 may store the uploaded photographs within one or more databases collectively represented by a database 112.

A dynamic attraction inference and route planning server 114 may evaluate the uploaded photographs stored within the database 112 to infer, and thereby identify, dynamic points of attraction. As described above, the dynamic points of attraction may be considered events that are transient in one or more of location and time. The dynamic attraction inference and route planning server 114 may routinely monitor uploaded photographs and may infer dynamic points of attraction as transient events that are of interest to multiple users as represented within content of multiple images uploaded contemporaneously by multiple different users.

The dynamic attraction inference and route planning server 114 may maintain a listing/collection of current/contemporaneous dynamic points of attraction. The dynamic attraction inference and route planning server 114 may infer new dynamic points of attraction as new transient events that are of interest to multiple users are inferred. Additionally, as transient events that have been previously identified as dynamic points of attraction are determined to no longer exist, previously-identified points of attraction may be removed from the collection of current/contemporaneous dynamic points of attraction. As such, the dynamic attraction inference and route planning server 114 may maintain dynamic points of attraction that are contemporaneously relevant for purposes of travel route recommendations.

Users of certain of the computing device_1 102 through the computing device_N 104 may also utilize the respective devices to request travel routes for travel planning purposes from the dynamic attraction inference and route planning server 114. The dynamic attraction inference and route planning server 114 may provide route planning services that identify not only routes between a specified origin and destination, but may also provide the contemporaneously-identified and relevant dynamic points of attraction that are near suggested/recommended travel routes. Users may evaluate content of the images associated with the contemporaneous dynamic points of attraction, and if any of the dynamic points of attraction are of interest to the users, the users may select a route that includes any dynamic points of attraction that are of interest to the respective users.

As will be described in more detail below in association with FIG. 2 through FIG. 4B, the dynamic attraction inference and route planning server 114 represents a new form of computing device and functionality that provides automated dynamic attraction inference in route recommendations. The automated dynamic attraction inference in route recommendations is based upon contemporaneous inference of events that are of interest to multiple computing device users as represented by similar content/scenes within contemporaneously-uploaded images. The dynamic attraction inference in route recommendations may alternatively be implemented within one or more of the server_1 108 through the server_M 110 and/or within one or more of the computing device_1 102 through the computing device_N 104, as appropriate for the given implementation. As such, the present technology may be implemented at a user computing device or server device level. A variety of possibilities exist for implementation of the present subject matter, and all such possibilities are considered within the scope of the present subject matter.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may include any device capable of providing data for consumption by a device, such as the computing device_1 102 through the computing device_N 104, via a network, such as the network 106. As such, the server_1 108 through the server_M 110 may each include a web server, application server, or other data server device.

The database 112 may include a relational database, an object database, or any other storage type of device. As such, the database 112 may be implemented as appropriate for a given implementation.

Figure 2:
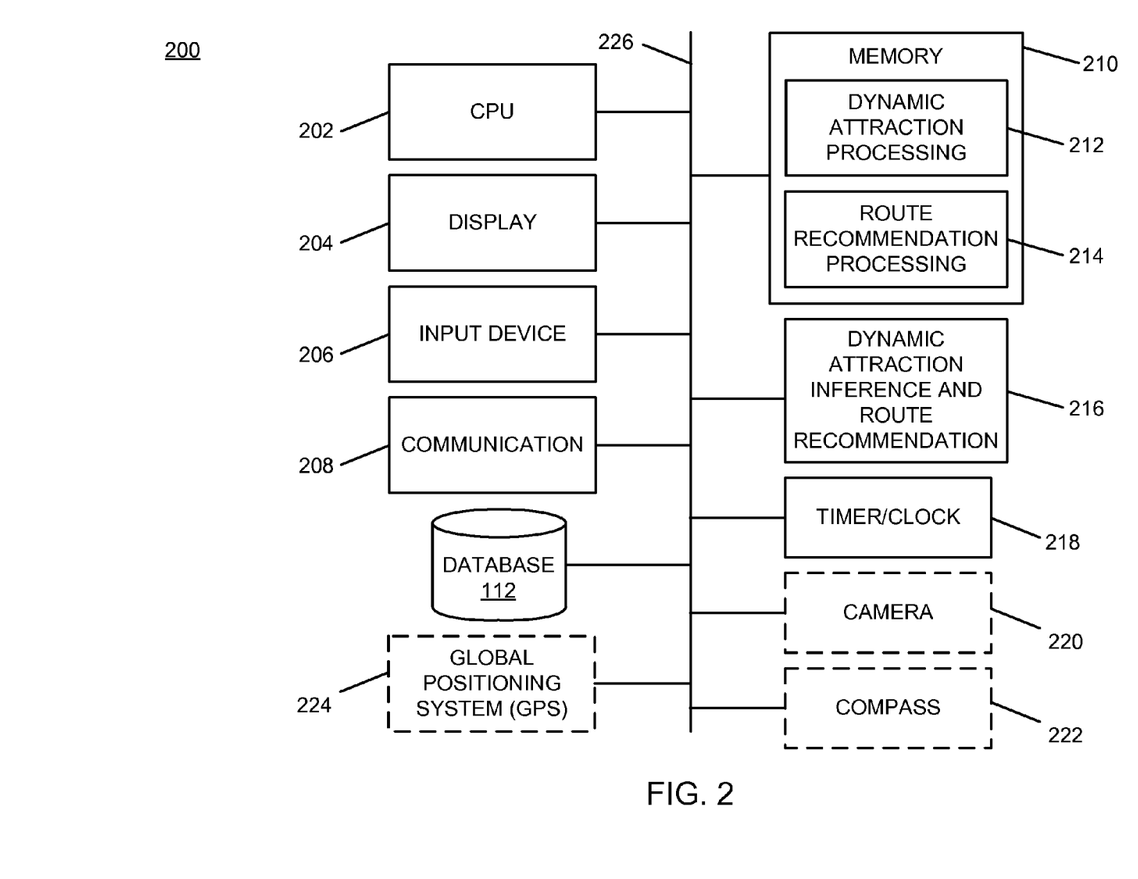
FIG. 2 is a block diagram of an example of an implementation of a core processing module capable of performing dynamic attraction inference in route recommendations according to an embodiment of the present subject matter.

FIG. 2 is a block diagram of an example of an implementation of a core processing module 200 capable of performing dynamic attraction inference in route recommendations. The core processing module 200 represents operational components of the dynamic attraction inference and route planning server 114, and certain components may also be associated with either the computing device_1 102 through the computing device_N 104 or with the server_1 108 through the server_M 110, as appropriate for a given implementation, including where one of these devices implement the functionality of the dynamic attraction inference and route planning server 114. As such, the core processing module 200 is described generally herein, though it is understood that many variations on implementation of the components within the core processing module 200 are possible and all such variations are within the scope of the present subject matter.

Further, the core processing module 200 may provide different and complementary processing of dynamic attraction inference in route recommendations in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, appropriate for a given implementation.

The database 112 is again shown within FIG. 2 associated with the core processing module 200. As such, the database 112 may be operatively coupled to the core processing module 200 without use of network connectivity, as appropriate for a given implementation.

A memory 210 includes a dynamic attraction processing area 212 that is used for processing image content for inference of dynamic points of attraction. The dynamic attraction processing area 212 is also used for storage of contemporaneous listings of dynamic points of attraction that have been identified.

The memory 210 also includes a route recommendation processing area 214 that provides processing and storage capabilities for maps and travel route requests. As described above and in more detail below, the dynamic points of attraction that are stored within the dynamic attraction processing area 212 and that are contemporaneously related in location and time to available travel routes may also be provided to route requesters as options for events to participate in or view along a travel route.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A dynamic attraction inference and route recommendation module 216 is also illustrated. The dynamic attraction inference and route recommendation module 216 provides analytical processing of image content associated with images that are uploaded by multiple users contemporaneously in time to identify common scenes that may represent dynamic points of attraction. The dynamic attraction inference and route recommendation module 216 utilizes directional bearing information associated with multiple images determined to have captured the same scene from different points of view to determine an intersection region that results from intersecting directions of capture of the several images. The dynamic attraction inference and route recommendation module 216 infers, based upon the interest of several users that have uploaded photographs of a similar scene, that the scene may be of interest as a dynamic attraction to other route-requesting users that are within a particular proximity of or distance to a location of the scene. The dynamic attraction inference and route recommendation module 216 implements the automated dynamic attraction inference in route recommendations of the core processing module 200.

It should also be noted that the dynamic attraction inference and route recommendation module 216 may form a portion of other circuitry described without departure from the scope of the present subject matter. Further, the dynamic attraction inference and route recommendation module 216 may alternatively be implemented as an application stored within the memory 210. In such an implementation, the dynamic attraction inference and route recommendation module 216 may include instructions executed by the CPU 202 for performing the functionality described herein. The CPU 202 may execute these instructions to provide the processing capabilities described above and in more detail below for the core processing module 200. The dynamic attraction inference and route recommendation module 216 may form a portion of an interrupt service routine (ISR), a portion of an operating system, a portion of a browser application, or a portion of a separate application without departure from the scope of the present subject matter.

A timer/clock module 218 is illustrated and used to determine time and date information, such as for use in association with the addition and deletion of dynamic points of attraction for use in route recommendations, as described above and in more detail below. As such, the dynamic attraction inference and route recommendation module 216 may utilize information derived from the timer/clock module 218 for information processing activities, such as the dynamic attraction inference in route recommendations.

It should be noted that a similar version of the timer/clock module 218 may be implemented in association with computing devices, such as the computing device_1 102 through the computing device_N 104, and that in such an implementation the timer/clock module 218 may be utilized to time/date stamp images that are captured with the respective computing device(s). Several other modules are illustrated within FIG. 2 in dashed-line form to represent that these modules may also be associated with such computing devices to capture images and to further document information about captured images.

A camera 220 may be used to capture image content in association with a computing device used by a user near a potential dynamic attraction. A compass module 222 may capture a directional bearing of a lens of the camera 220 and information derived from the compass module 222 may be encoded into or otherwise associated with image content to document a bearing or direction of capture of the respective image content. A global positioning system (GPS) module 224 may provide positioning location coordinates usable for identifying a location at which an image is captured. Again, information derived from the GPS module 224 may be encoded into or otherwise associated with image content to document a bearing or direction of capture of the respective image content.

As such, collectively the camera 220, the timer/clock module 218, the compass module 222, and the GPS module 224 may be used to capture image content and to document the location of the captured image content, to document an orientation (directional bearing) of the image content relative to the location of the image capture, and to document the time and date of the image capture. The dynamic attraction inference and route recommendation module 216 may utilize this collection of information associated with multiple different uploaded images to correlate image capture of multiple different images with respect to time, date, and location. The dynamic attraction inference and route recommendation module 216 may further analyze image content of different images that are correlated in time, date, and location to determine whether the contemporaneous image content of the different images uploaded by different users represents a common/similar scene captured from different directions. In response to determining that directional bearings of the different images captured at a correlated time, date, and location converge on a common/similar scene within the image content, the dynamic attraction inference and route recommendation module 216 may infer the intersection region of the directional bearings of the different images uploaded by different users as a dynamic attraction.

As such, crowd-based popularity of scenes/events may be used to infer dynamic points of attraction at locations that are distinct from a fixed-location point of interest and that would otherwise be unavailable for use in route recommendations. The dynamic attraction inference and route recommendation module 216 may utilize inferred dynamic points of attraction that are confirmed to be of interest to multiple different users by convergence of directional bearings of multiple different images captured by the different users to provide route recommendations that identify the dynamic attraction(s) that occur contemporaneously with an intended travel time along a given route. The dynamic attraction inference and route recommendation module 216 may update previously-provided routing recommendations with new dynamic attractions and may remove dynamic attractions that are no longer in existence.

The CPU 202, the display 204, the input device 206, the communication module 208, the memory 210, the dynamic attraction inference and route recommendation module 216, the timer/clock 218, the camera 220, the compass module 222, the GPS module 224, and the database 112 are interconnected via an interconnection 226. The interconnection 226 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the database 112 is illustrated as a separate component for purposes of example, the information stored within the database 112 may also/alternatively be stored within the memory 210 without departure from the scope of the present subject matter. Accordingly, the core processing module 200 may take many forms and may be associated with many platforms.

Figure 3:
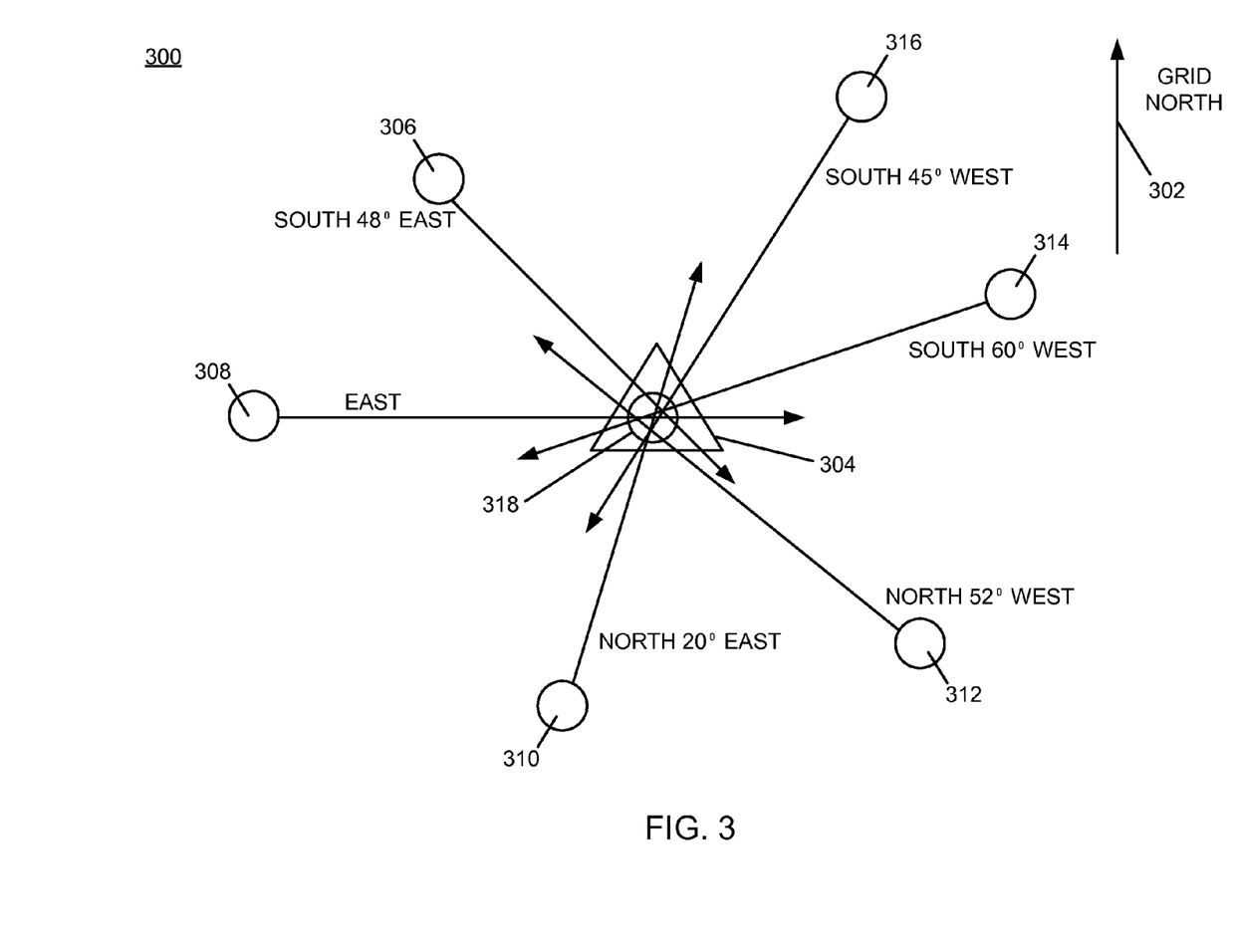
FIG. 3 is a top view diagram of an event that illustrates an example of an implementation of information analysis associated with captured image content for dynamic attraction inference in route recommendations according to an embodiment of the present subject matter.

FIG. 3 is a top view diagram of an event 300 that illustrates an example of an implementation of information analysis associated with captured image content for dynamic attraction inference in route recommendations. As can be seen from FIG. 3, a true grid North arrow 302 represent a magnetic North bearing relative to the event 300 and images captured at the event 300. A dynamic attraction 304 is illustrated as a triangle within FIG. 3 and represents a dynamic scene/event that has attracted multiple individuals as documented by images captured by the respective individuals from different locations. For purposes of the present example, the dynamic attraction 304 may be considered a juggler that is performing with other performers (e.g., acrobats, clowns, etc.) at a shopping mall during a particular time and date. A contemporaneous time, such as within a few minutes or within an hour, is presumed to be associated with each captured image.

Several different individual users and camera-enabled computing devices (users/devices) are collectively represented as circles to reduce complexity of the drawing figure. It is understood that the respective camera-enabled computing devices may be implemented with the computing device_1 102 through the computing device_N 104 as described above. Further, the respective camera-enabled phones, cameras, or other computing devices may implement relevant portions of the core processing module 200 described above. As also described above, the respective camera-enabled computing devices may capture images in response to user inputs and may upload the images to one or more of the server_1 108 through the server_M 110. The respective camera-enabled computing devices may further encode, in association with each image, digital data that identifies an image capture location (e.g., GPS coordinates), an image capture time and date, and an image capture directional bearing associated with images captured by the respective users using the respective camera-enabled computing devices.

A user/device 306 is shown located North and West (as specified by appropriate GPS coordinates associated with a captured image) from the dynamic attraction 304, and is shown to have captured an image with a bearing relative to due South turned forty-eight degrees East (e.g., "SOUTH 48° EAST") relative to the location of capture of the respective captured image. Similarly, a user/device 308 is shown located West from the dynamic attraction 304, and is shown to have captured an image with a bearing of due "EAST" relative to the location of capture of the respective captured image. A user/device 310 is shown located South and West from the dynamic attraction 304, and is shown to have captured an image with a bearing relative to due North turned twenty degrees East (e.g., "NORTH 20° EAST") relative to the location of capture of the respective captured image. A user/device 312 is shown located South and East from the dynamic attraction 304, and is shown to have captured an image with a bearing relative to due North turned fifty-two degrees West (e.g., "NORTH 52° WEST") relative to the location of capture of the respective captured image. A user/device 314 is shown located North and East from the dynamic attraction 304, and is shown to have captured an image with a bearing relative to due South turned sixty degrees West (e.g., "SOUTH 60° WEST") relative to the location of capture of the respective captured image. A user/device 316 is shown located North and East from the dynamic attraction 304, and is shown to have captured an image with a bearing relative to due South turned forty-five degrees West (e.g., "SOUTH 45° WEST") relative to the location of capture of the respective captured image.

It is understood that the respective directional bearings represented within FIG. 3 are not to scale, and are utilized for purposes description of the present technology. It is further understood that bearings may be specified with further granularity, including use of minutes of angle and seconds of angle as used in the surveying profession (e.g., "SOUTH 45° 6'45" WEST"), as appropriate for the respective camera-enabled computing device and technology.

As described above and in more detail below, the dynamic attraction inference and route recommendation module 216 may utilize the data captured in association with the respective images to correlate the images in time and general location, and may further evaluate the content of the images to determine whether the different images capture different perspectives/orientations of the same event/scene. In response to determining that multiple images captured by multiple different individuals capture the same event/scene in a contemporaneous manner, the dynamic attraction inference and route recommendation module 216 may further evaluate the respective directional bearings encoded in association with the respective images to determine an intersection region 318.

The intersection region 318 is represented as a circle within the dynamic attraction 304 and captures a scope and breadth of location represented by the multiple different directional bearings of the different images of the dynamic attraction 304. As can be seen from FIG. 3, all intersections of the respective directional bearings that are near the dynamic attraction 304 are encapsulated within the intersection region 318.

The dynamic attraction inference and route recommendation module 216 may infer the dynamic attraction 304 to be a new dynamic attraction, and may add the new dynamic attraction along with a link to at least one of the captured images to a list/database of dynamic points of attraction. In response to a user request for a route that may travel near a vicinity of the dynamic attraction 304, the dynamic attraction inference and route recommendation module 216 may provide the dynamic attraction as a recommendation to the user along with a link to the respective captured image(s). As such, users may view the image content associated with the dynamic points of attraction that are recommended to determine whether they are interested in taking a short detour from travel to enjoy the performance at the dynamic attraction 304.

Figure 4:
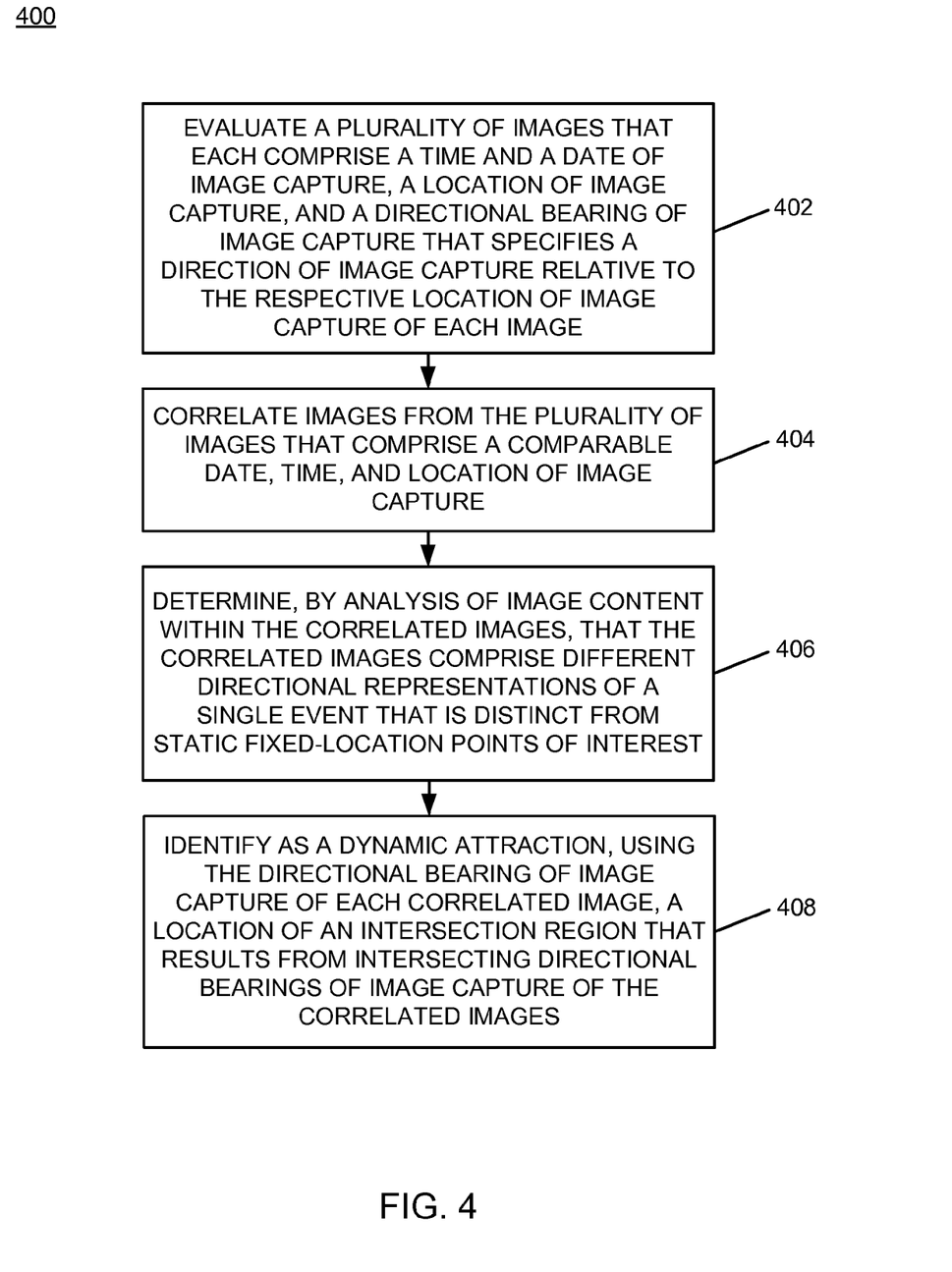
FIG. 4 is a flow chart of an example of an implementation of a process for dynamic attraction inference in route recommendations according to an embodiment of the present subject matter.
Figure 5A:
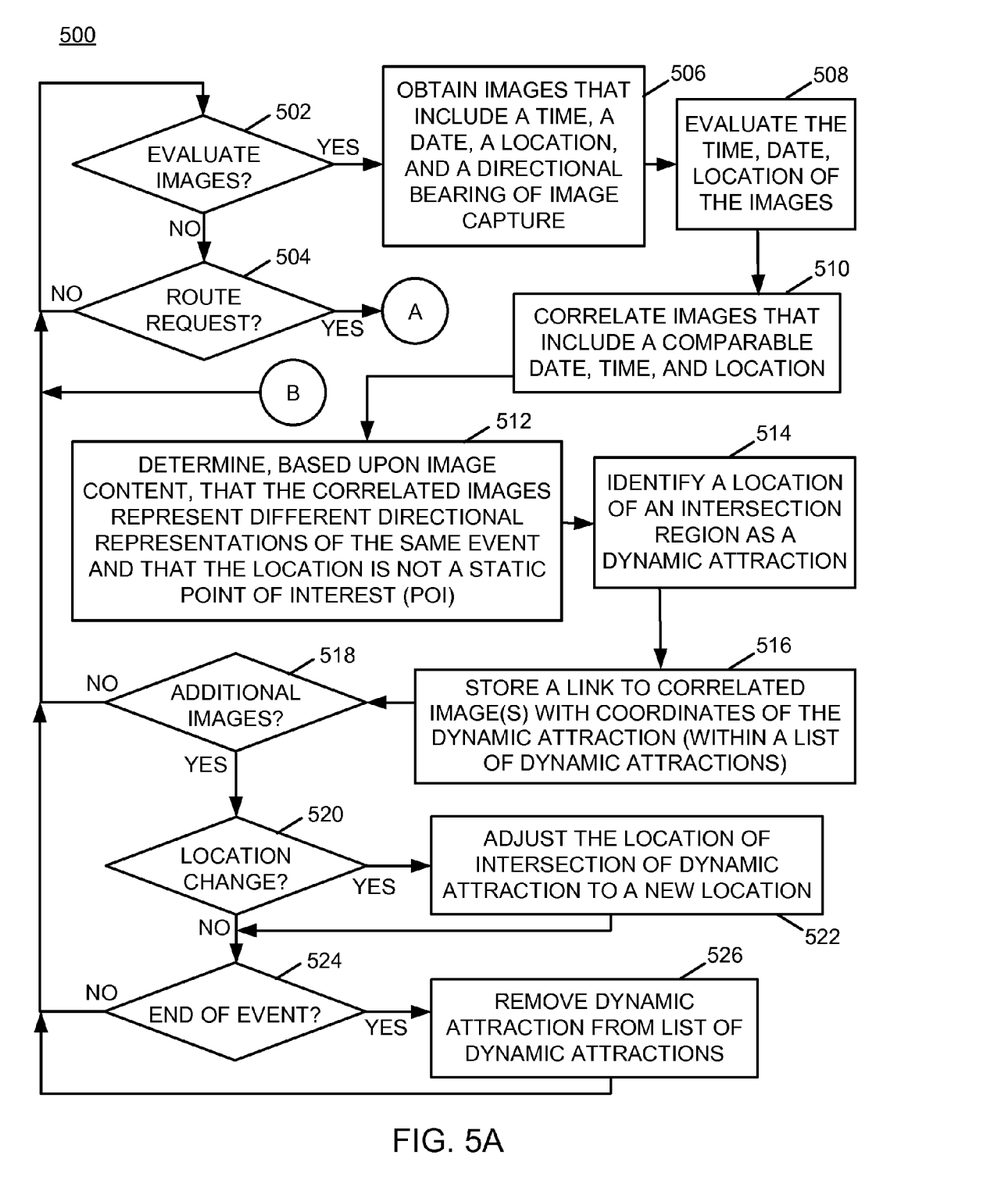
FIG. 5A is a flow chart of an example of an implementation of initial processing within a process for dynamic attraction inference in route recommendations that manages lists of dynamic attractions and routing requests according to an embodiment of the present subject matter.
Figure 5B:
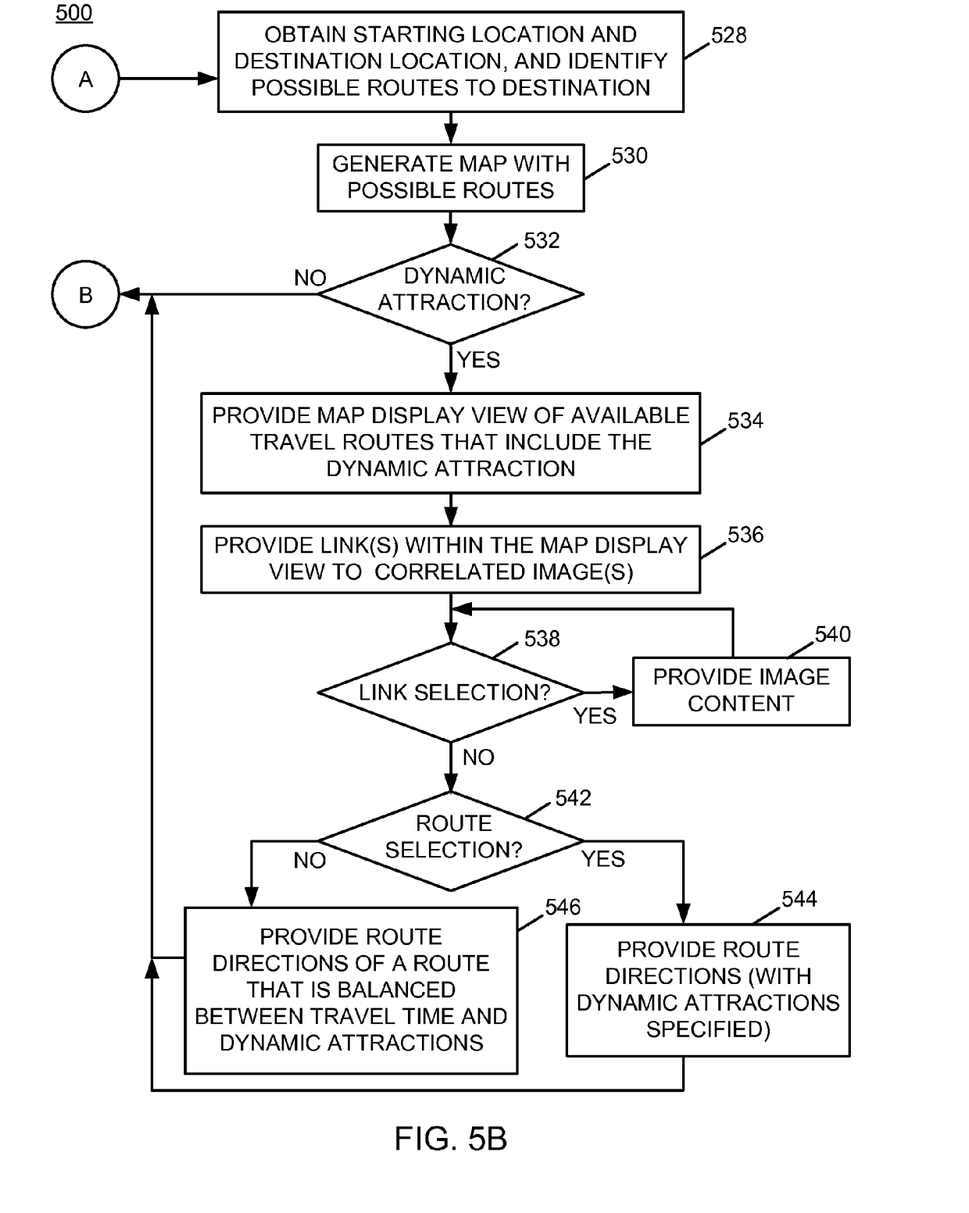
FIG. 5B is a flow chart of an example of an implementation of additional processing within a process for dynamic attraction inference in route recommendations that manages lists of dynamic attractions and routing requests according to an embodiment of the present subject matter.

FIG. 4 through FIG. 5B described below represent example processes that may be executed by devices, such as the core processing module 200, to perform the automated dynamic attraction inference in route recommendations associated with the present subject matter. Many other variations on the example processes are possible and all are considered within the scope of the present subject matter. The example processes may be performed by modules, such as the dynamic attraction inference and route recommendation module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 4 is a flow chart of an example of an implementation of a process 400 for dynamic attraction inference in route recommendations. At block 402, the process 400 evaluates a plurality of images that each comprise a time and a date of image capture, a location of image capture, and a directional bearing of image capture that specifies a direction of image capture relative to the respective location of image capture of each image. At block 404, the process 400 correlates images from the plurality of images that comprise a comparable date, time, and location of image capture. At block 406, the process 400 determines, by analysis of image content within the correlated images, that the correlated images comprise different directional representations of a single event that is distinct from static fixed-location points of interest. At block 408, the process 400 identifies as a dynamic attraction, using the directional bearing of image capture of each correlated image, a location of an intersection region that results from intersecting directional bearings of image capture of the correlated images.

FIGS. 5A-5B illustrate a flow chart of an example of an implementation of process 500 for dynamic attraction inference in route recommendations that manages lists of dynamic attractions and routing requests. FIG. 5A illustrates initial processing within the process 500. At decision point 502, the process 500 makes a determination as to whether to an image processing event that invokes evaluation of images to identify or manage dynamic attractions has been detected or received. An event that invokes evaluation of images to identify or manage dynamic attractions may include an upload of many images to social media servers from users, a periodic or other routine invocation of processing to evaluate images, or other form of image processing event as appropriate for a given implementation.

As part of higher-level processing of the process 500, in response to determining that an image processing event that invokes evaluation of images to identify or manage dynamic attractions has not been detected or received, the process 500 makes a determination at decision point 504 as to whether a route request has been received. Processing for an affirmative determination at decision point 504 will be deferred and described in more detail below in association with FIG. 5B. As such, in response to determining that a route request has not been received, the process 500 returns to decision point 502 and iterates as described above.

In response to determining at decision point 502 that an image processing event that invokes evaluation of images to identify or manage dynamic attractions has been detected or received, the process 500 obtains, at block 506, images that include a time and a date of image capture, a location of image capture, and a directional bearing that specifies a direction of capture relative to the respective location of image capture of each of the respective images. At block 508, the process 500 evaluates the time, date, and location of the obtained images. At block 510, the process 500 correlates images from the obtained images that include a comparable date, time, and location of image capture.

At block 512, the process 500 determines, based upon the image content within the correlated images, that the correlated images represent different directional representations of a single (e.g., the same) event and that the location information of the obtained images is distinct from (e.g., does not identify) static fixed-location points of interest (POIs). As such, the process 500 excludes static points of interest that are already documented by prior use of GPS coordinates or other forms of identification.

At block 514, the process 500 identifies a location of an intersection region that results from intersecting directional bearings of capture of the correlated images as a dynamic attraction. The process 500 may utilize the directional bearing of capture of each correlated image to identify the intersection region.

At block 516, the process 500 stores a link to at least one of the correlated images with coordinates of the dynamic attraction specified by the intersection region. The link to the correlated image(s) and the coordinates of the dynamic attraction specified by the intersection region may be stored within a list of currently-relevant dynamic attractions. As described above and in more detail below, a listing of currently-relevant dynamic attractions may be provided to users in association with travel route requests as an enhanced travel route that includes the dynamic attractions that are currently relevant along their travel routes.

At decision point 518, the process 500 makes a determination as to whether to process any additional images. For example, where the dynamic attraction is a parade, the parade may have moved location and other users may be taking photographs of the parade as it moves along. Alternatively, stationary or mobile dynamic attractions may end after a period of time and users may no longer be able to take contemporaneous photographs of the event, and any uploaded photographs may be time-stamped with a date/time that is relevant to a previous dynamic attraction that has completed. In response to determining not to process additional images (at the current time), the process 500 returns to decision point 502 and iterates as described above. The process 500 may be configured to routinely invoke itself, such as by use of a timer, to process additional images and may return to decision point 518 in response to any such invocation.

In response to determining at decision point 518 to process additional images, the process 500 makes a determination at decision point 520 as to whether a location change associated with a currently-listed dynamic attraction has occurred. Part of the processing at decision point 520 may include determining, by analysis of image content of a set of additional images, that additional directional representations of the single/same event are associated with different comparable times and locations of image capture. In response to determining that a location change associated with a currently listed dynamic attraction has occurred, the process 500 adjusts the dynamic attraction to a new location of a new intersection region that results from the different intersecting directional bearings of capture of the set of additional images at block 522.

In response to adjusting the location of the dynamic attraction to the new location and identifying the new location as a current location of the dynamic attraction at block 522, or in response to determining at decision point 520 that a location change associated with a currently-listed dynamic attraction has not occurred, the process 500 makes a determination at decision point 524 as to whether an event associated with any listed dynamic attraction has ended. Part of the processing at decision point 524 may include determining, by analysis of image content of a set of additional correlated images, that no additional representations of the single/same event associated with a listed dynamic attraction have date/time stamps that are current (e.g., no recent photographs), which may be used to infer that the dynamic attraction has ended. Alternatively, the processing may include determining, by analysis of image content of a set of additional correlated images, that additional current representations of the single/same event are no longer available in association with the dynamic attraction. In response to determining that an event associated with any listed dynamic attraction has ended, the process 500 removes the respective dynamic attraction from the list of available dynamic attractions at block 526. In response to removing the respective dynamic attraction from the list of available dynamic attractions at block 526, or in response to determining at decision point 524 that an event associated with any listed dynamic attraction has not ended, the process 500 returns to decision point 502 and iterates as described above.

Returning to the description of decision point 504, in response to determining that a route request has been received, the process 500 transitions to the processing shown and described in association with FIG. 5B.

FIG. 5B illustrates additional processing associated with the process 500 for dynamic attraction inference in route recommendations that manages lists of dynamic attractions and routing requests. At block 528, the process 500 obtains a starting location and an ending location from a user in association with the route request, and identifies possible routes to the destination. At block 530, the process 500 generates a map with possible routes to the destination highlighted for the user.

At decision point 532, the process 500 makes a determination as to whether any currently-active dynamic attractions are in a vicinity of any of the identified possible routes to the destination. In response to determining that no currently-active dynamic attractions are in a vicinity of any of the identified possible routes to the destination, the process 500 returns to the processing described in association with FIG. 5A at decision point 502, and iterates as described above.

In response to determining at decision point 532 that at least one currently-active dynamic attraction is in a vicinity of any of the identified possible routes to the destination, the process 500 provides a map display of available travel routes that include the dynamic attraction(s) on the map at block 534. At block 536, the process 500 provides a hypertext link within the map display view to at least one of the correlated images within the travel route recommendation in response to a request for a travel route from a user that travels near the dynamic attraction.

At decision point 538, the process 500 makes a determination as to whether a correlated image link has been selected by the user (e.g., by receipt of a hypertext transfer protocol (HTTP) message that specifies an associated uniform resource locator (URL)). In response to determining that a correlated image link has been selected by the user, the process 500 provides the image content of the correlated image to the user at block 540. The process 500 returns to decision point 538 to process additional link selections.

In response to determining at decision point 538 that no link (or additional link) has been selected (e.g., in response to a timeout), the process 500 makes a determination at decision point 542 as to whether one of the possible routes has been selected by the user, such as a possible route that includes a current dynamic attraction. In response to determining that a route has been selected by a user, the process 500 provides route directions, with any associated dynamic attractions that are located near the selected route at block 544. In response to determining at decision point 542 that no route has been selected by a user, the process 500 provides route directions of a route that balances between a travel time and dynamic attraction availability at block 546. In response to the processing at either of block 544 and block 546, the process 500 returns to the processing described in association with FIG. 5A at decision point 502, and iterates as described above.

As such, the process 500 evaluates image content associated with contemporaneously-captured images that are closely located geographically, and identifies images of a contemporaneous scene/event that is not listed as a static fixed-location point of interest (POI). The process 500 identifies such events as dynamic attractions, and provides the dynamic attractions as suggestions in association with route requests. The process 500 additionally manages a list of dynamic attractions to ensure that the listed dynamic attractions are of interest to multiple persons and are still active (e.g., have not ended). The process 500 adjusts locations of moving dynamic attractions, and removes dynamic attractions that have ended from the suggestion list of dynamic attractions.

As described above in association with FIG. 1 through FIG. 5B, the example systems and processes provide dynamic attraction inference in route recommendations. Many other variations and additional activities associated with dynamic attraction inference in route recommendations are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A method, comprising:
   evaluating a plurality of images that each comprise a time and a date of image capture, a location of image capture, and a directional bearing of image capture that specifies a direction of image capture relative to the respective location of image capture of each image;
   correlating images from the plurality of images that comprise a comparable date, time, and location of image capture;
   determining, by analysis of image content within the correlated images, that the correlated images comprise different directional representations of a single event that is distinct from static fixed-location points of interest; and
   identifying as a dynamic attraction, using the directional bearing of image capture of each correlated image, a location of an intersection region that results from intersecting directional bearings of image capture of the correlated images.

2. The method of claim 1, further comprising providing the dynamic attraction as a dynamic event recommendation in association with a recommended travel route near the intersection region.

3. The method of claim 1, further comprising:
   determining, by analysis of image content of additional correlated images, that additional directional representations of the single event are associated with different comparable times and locations of image capture; and adjusting the dynamic attraction to a new location of a new intersection region that results from intersecting directional bearings of image capture of the additional correlated images.

4. The method of claim 1, further comprising:
determining, by analysis of image content of additional correlated images, that additional current representations of the single event are not available in association with the dynamic attraction; and
removing the dynamic attraction from a list of available dynamic attractions.

5. The method of claim 1, further comprising providing a map display view of available travel routes comprising the dynamic attraction identified by the location of the intersection region.

6. The method of claim 5, further comprising providing a hypertext link within the map display view to at least one of the correlated images within a travel route recommendation in response to a request for a travel route from a user that travels near the dynamic attraction.

7. The method of claim 6, further comprising providing image content from the at least one of the correlated images in response to a user selection of the provided hypertext link.

8. A system, comprising:
a memory; and
a processor programmed to:
evaluate a plurality of images within the memory that each comprise a time and a date of image capture, a location of image capture, and a directional bearing of image capture that specifies a direction of image capture relative to the respective location of image capture of each image;
correlate images from the plurality of images that comprise a comparable date, time, and location of image capture;
determine, by analysis of image content within the correlated images, that the correlated images comprise different directional representations of a single event that is distinct from static fixed-location points of interest; and
identify as a dynamic attraction, using the directional bearing of image capture of each correlated image, a location of an intersection region that results from intersecting directional bearings of image capture of the correlated images.

9. The system of claim 8, where the processor is further programmed to provide the dynamic attraction as a dynamic event recommendation in association with a recommended travel route near the intersection region.

10. The system of claim 8, where the processor is further programmed to:
determine, by analysis of image content of additional correlated images, that additional directional representations of the single event are associated with different comparable times and locations of image capture; and
adjust the dynamic attraction to a new location of a new intersection region that results from intersecting directional bearings of image capture of the additional correlated images.

11. The system of claim 8, where the processor is further programmed to:
determine, by analysis of image content of additional correlated images, that additional current representations of the single event are not available in association with the dynamic attraction; and
remove the dynamic attraction from a list of available dynamic attractions.

12. The system of claim 8, where the processor is further programmed to provide a map display view of available travel routes comprising the dynamic attraction identified by the location of the intersection region.

13. The system of claim 12, where the processor is further programmed to:
provide a hypertext link within the map display view to at least one of the correlated images within a travel route recommendation in response to a request for a travel route from a user that travels near the dynamic attraction; and
provide image content from the at least one of the correlated images in response to a user selection of the provided hypertext link.

14. A computer program product, comprising:
a computer readable storage medium having computer readable program code embodied therewith, where the computer readable program code when executed on a computer causes the computer to:
evaluate a plurality of images that each comprise a time and a date of image capture, a location of image capture, and a directional bearing of image capture that specifies a direction of image capture relative to the respective location of image capture of each image;
correlate images from the plurality of images that comprise a comparable date, time, and location of image capture;
determine, by analysis of image content within the correlated images, that the correlated images comprise different directional representations of a single event that is distinct from static fixed-location points of interest; and
identify as a dynamic attraction, using the directional bearing of image capture of each correlated image, a location of an intersection region that results from intersecting directional bearings of image capture of the correlated images.

15. The computer program product of claim 14, where the computer readable program code when executed on the computer further causes the computer to provide the dynamic attraction as a dynamic event recommendation in association with a recommended travel route near the intersection region.

16. The computer program product of claim 14, where the computer readable program code when executed on the computer further causes the computer to:
determine, by analysis of image content of additional correlated images, that additional directional representations of the single event are associated with different comparable times and locations of image capture; and
adjust the dynamic attraction to a new location of a new intersection region that results from intersecting directional bearings of image capture of the additional correlated images.

17. The computer program product of claim 14, where the computer readable program code when executed on the computer further causes the computer to:
determine, by analysis of image content of additional correlated images, that additional current representations of the single event are not available in association with the dynamic attraction; and
remove the dynamic attraction from a list of available dynamic attractions.

18. The computer program product of claim 14, where the computer readable program code when executed on the computer further causes the computer to provide a map display view of available travel routes comprising the dynamic attraction identified by the location of the intersection region.

19. The computer program product of claim 18, where the computer readable program code when executed on the computer further causes the computer to provide a hypertext link within the map display view to at least one of the correlated images within a travel route recommendation in response to a request for a travel route from a user that travels near the dynamic attraction.

20. The computer program product of claim 19, where the computer readable program code when executed on the computer further causes the computer to provide image content from the at least one of the correlated images in response to a user selection of the provided hypertext link.

* * * * *